(12) United States Patent
Otteman

(10) Patent No.: US 6,519,890 B1
(45) Date of Patent: Feb. 18, 2003

(54) RADIAL DETENTS FOR RIFLE SCOPE ADJUSTMENT

(75) Inventor: Rodney H. Otteman, Aloha, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 10/211,120

(22) Filed: Aug. 2, 2002

Related U.S. Application Data

(63) Continuation of application No. 09/917,061, filed on Jul. 27, 2001, now abandoned.
(60) Provisional application No. 60/221,845, filed on Jul. 28, 2000.

(51) Int. Cl.[7] .................................................. F41G 1/38
(52) U.S. Cl. ............................................................ 42/122
(58) Field of Search .................................... 42/122, 119

(56) References Cited

U.S. PATENT DOCUMENTS

| | | | |
|---|---|---|---|
| 2,143,167 A | 1/1939 | Pechar | 33/50 |
| 2,165,796 A | 7/1939 | Humeston | 33/50 |
| 2,208,913 A | 7/1940 | Unertl | 33/50 |
| 2,229,637 A | 1/1941 | Burton | 33/56 |
| 2,336,107 A * | 12/1943 | Litschert | 116/67 R |
| 2,913,826 A | 11/1959 | Petty | 33/50 |
| 3,037,287 A | 6/1962 | Glatz et al. | 33/46 |
| 3,058,391 A | 10/1962 | Leupold | 88/32 |
| 3,222,987 A * | 12/1965 | Wrigglesworth | 359/427 |
| 3,280,463 A * | 10/1966 | Stadler | 42/122 |
| 3,297,389 A | 1/1967 | Gibson | 350/10 |
| 3,826,012 A | 7/1974 | Pachmayr | 33/246 |
| 3,990,155 A | 11/1976 | Akin, Jr. et al. | 33/247 |
| 4,038,757 A | 8/1977 | Hicks et al. | 33/247 |
| 4,200,355 A | 4/1980 | Williams, Jr. | 350/10 |
| 4,247,161 A | 1/1981 | Unertl, Jr. | 350/10 |
| 4,373,269 A | 2/1983 | Doliber et al. | 33/246 |
| 4,408,842 A | 10/1983 | Gibson | 350/560 |
| 4,982,502 A * | 1/1991 | Weyrauch | 359/424 |
| 5,363,559 A | 11/1994 | McCarty | 33/246 |
| 5,433,010 A * | 7/1995 | Bell | 42/122 |
| 5,513,440 A | 5/1996 | Murg | 33/246 |
| 5,615,487 A * | 4/1997 | Tomita | 42/122 |
| 5,771,595 A * | 6/1998 | Bell | 42/122 |
| 6,005,711 A | 12/1999 | Mai et al. | 359/424 |
| 6,279,259 B1 * | 8/2001 | Otteman | 42/119 |

FOREIGN PATENT DOCUMENTS

| | | | |
|---|---|---|---|
| GB | 598306 | 2/1948 | 33/246 |

* cited by examiner

Primary Examiner—Charles T. Jordan
Assistant Examiner—Jordan M Lofdahl
(74) Attorney, Agent, or Firm—Stoel Rives LLP

(57) ABSTRACT

The invention provides a unique rifle scope detent mechanism, and rifle scope including such a detent mechanism, for adjusting elevation and windage of a rifle. The detent mechanism includes a convex spring with a detent ridge, that cooperates with grooves formed on a frontal face of a jack nut. Accordingly, as the jack nut is rotated during adjustment of the rifle scope, grooves of the jack nut click in and out of ridges of the spring. The jack nut is threadingly coupled to a jack screw that reciprocates as the nut rotates, thereby urging against an inner tube of the rifle scope that contains optics to adjust the rifle for elevation or windage.

28 Claims, 6 Drawing Sheets

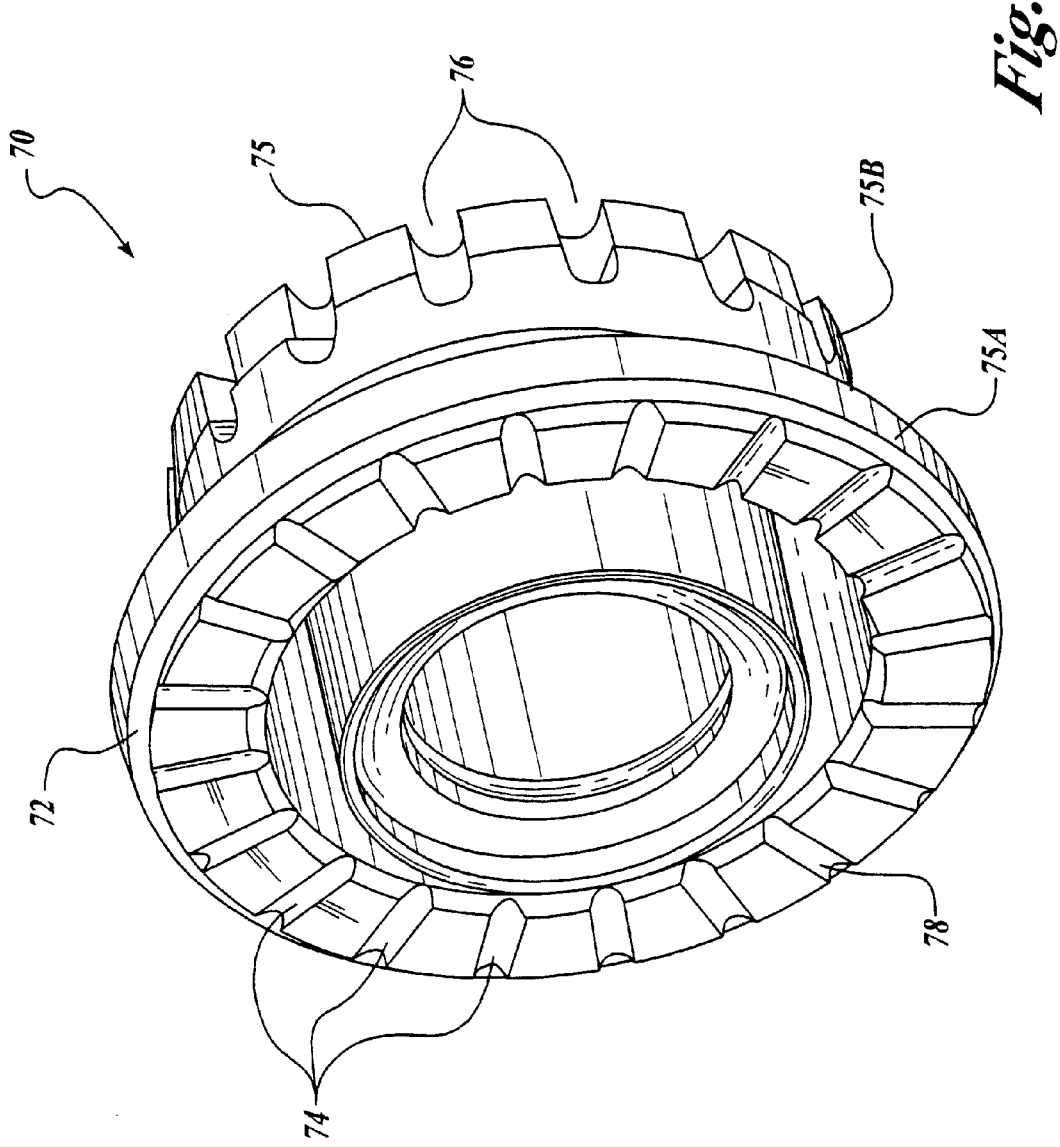

RADIAL DETENTS FOR RIFLE SCOPE ADJUSTMENT

This application is a continuation of U.S. application Ser. No. 09/917,061, filed Jul. 27, 2001, now abandoned, which claims priority under 35 U.S.C. §119(e) from U.S. Provisional Application No. 60/221,845, filed Jul. 28, 2000.

TECHNICAL FIELD

The present invention relates to the field of telescopic rifle scopes, and in particular, to rifle scopes that have an internal or self contained adjustment mechanism for elevation and windage.

BACKGROUND OF THE INVENTION

In a rifle, adjustment of the point of aim is necessary for two reasons: The rifle scope when it is mounted on the rifle cannot be precisely mounted on the rifle bore and therefore requires an adjustment to align the scope to the rifle. This is called "sighting in the scope" and is generally done when the scope is mounted on the rifle or when there is some question as to the fidelity of the mount. Secondly, when a bullet is fired from a rifle, it commences falling from the moment that it leaves the rifle barrel due to the force of gravity. Consequently, if a rifle scope were not adjustable in the field for distance then a bullet might not strike a distant target, but would likely pass below the target by the distance the bullet has fallen. Accordingly, modern rifle scope design permits adjustment of the scope to compensate for the distance through which a bullet will fall before it reaches a target. This scope adjustment for vertical fall of the bullet is known as "holdover" or "elevation". The internal lens of the scope are moved so that a new optical path is created which takes in the "holdover" adjustment. As a result of the adjustment of the scope, the shooter is able to simply aim at the target through the scope so that the target falls within the crosshairs, and then fire, without having to otherwise take into account the distance through which the bullet will fall in traveling to the target.

A similar horizontal adjustment of the scope allows compensation for sideways movement of the bullet caused by wind. This sideways adjustment is known as a "windage" adjustment.

For adjustment of the scope, many scopes use a rotating knob or dial that is located in the middle section of the scope tube and orientated horizontally and vertical to the longitudinal axis of the scope. The dial is divided or segmented about its axis such that the "click" mechanism provides an audible or tactile indication for every increment of rotation of a dial that is used to adjust the scope for elevation or windage. That is, the shooter makes the adjustment to the scope by observing where the bullet is impacting relative to the crosshairs of the scope and turning the adjustment dial a calculated number of clicks in the correct direction. Since most adjustments are incremented at useful segments (¼ in at 100 yards or ½ cm at 100 meters) it is relatively easy to adjust the bullet impact into the center of the target and the scope crosshairs. In certain scopes, the dial cooperates with a mechanism that causes a jack screw, or other device, to move up or down proportionately with the degree of rotation of the dial depending upon the direction of rotation of the dial. Typically, the jack screw penetrates an outer tube of the rifle scope, and the end of the screw impinges on the outer surface of the inner tube of the scope, in which an erector assembly or lens assembly is mounted. Often, the inner tube is supported in the outer tube and is able to pivot about a pivot axis within the outer tube. Thus, as the jack screw urges against the inner tube, it causes precise controlled pivotal motion of the inner tube within the outer tube thereby adjusting the scope for elevation or windage.

A variety of mechanisms have been used or proposed over the years that include a detent or click feature. One example of such a mechanism is the use of a tubular collar, with longitudinal internal grooves spaced at precise distances apart, and positioned so that they form a pattern centered on the adjustment screw axis that rotates in concert with the adjustment dial of the scope. The mechanism includes a slidably fixed member with a ball at its tip that is urged against the grooves of the collar, so that the device emits an audible and tactile click whenever the dial is rotated and the ball clicks over from a seated position in one groove to a position in the next groove. This kind of mechanism not only requires very precisely machined grooves on an inner surface of a collar, but also a finely machined ball. Both components are subjected to continual wear as the dial is used.

SUMMARY OF THE INVENTION

In accordance with the invention, there is provided a detent mechanism for the adjustment of a rifle scope for elevation and windage and a scope including the detent mechanism.

The invention is applicable to a variety of rifle scopes, and in one embodiment, in which the rifle scope includes an outer tube within which an inner tube containing optical elements is pivotally mounted, the detent mechanism includes mechanical components that provide a tactile and/or audible click when the rifle scope is adjusted by controlled movement of the inner tube. The detent mechanism of the invention includes a spring with a central opening and at least one detent ridge on an upper surface of the spring. The spring is located in, and prevented from rotational movement in, the socket of the outer tube of the rifle, and has a bias force directed away from a base of the socket. A jack screw passes through the opening of the spring and extends into a slot at the base of the socket, to contact the inner tube of the rifle scope. The screw is prevented from rotational movement in the slot. A jack nut threadingly engages the jack screw, and has a frontal face that includes a series of precisely spaced radially extending grooves that are sized to cooperate with the detent ridges of the spring. Thus, the spring urges its upper surface against the face of the nut with sufficient force to urge a detent ridge into a registering groove of the nut. As the nut rotates, when the rifle scope is adjusted, a groove enters a detent ridge with an audible and tactile click, while the jack screw moves up or down thereby urging the inner tube and adjusting the optics of the rifle scope.

The adjustable rifle scope of the invention provides many advantages. Among these being reduced mechanical wear, simplified manufacture and reduced cost relative to some of the commercially available adjustable rifle scopes.

Additional aspects and advantages of this invention will be apparent from the following detailed description of preferred embodiments thereof, which proceeds with reference to the accompanying drawings.

BRIEF DESCRIPTION OF THE DRAWINGS

The following drawings illustrate embodiments of the invention for purposes of instruction and explanation and do not limit the scope of the invention. The drawings are schematic, and may not be to scale.

FIG. 8 is a schematic perspective view of a jack nut useful in the invention.

DETAILED DESCRIPTION OF PREFERRED EMBODIMENTS

The following description and its reference to appended drawings is intended to explain the principles of the invention to one of skill in the technology, and does not limit the scope of the invention which will become more apparent after reading this description.

Figure 1:
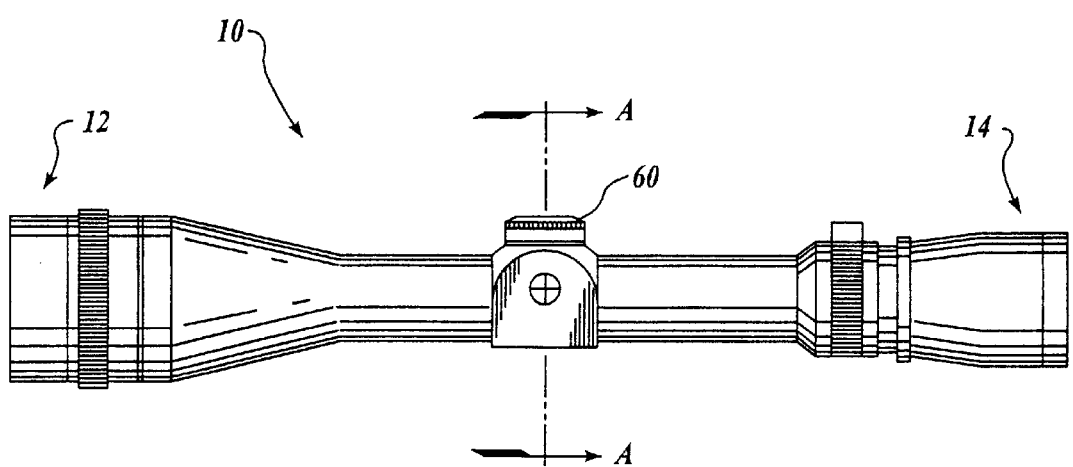
FIG. 1 is a schematic side view of a typical rifle scope.

FIG. 1 is a schematic diagram of a rifle scope 10 that has a view end 12 and an eye piece end 14. Scope adjustment mechanisms are located proximate the midpoint of the scope, and FIG. 1 shows the adjusting cap 60 of the elevation mechanism. Further details of the adjusting mechanism of the present invention are shown in FIG. 2.

Figure 2:
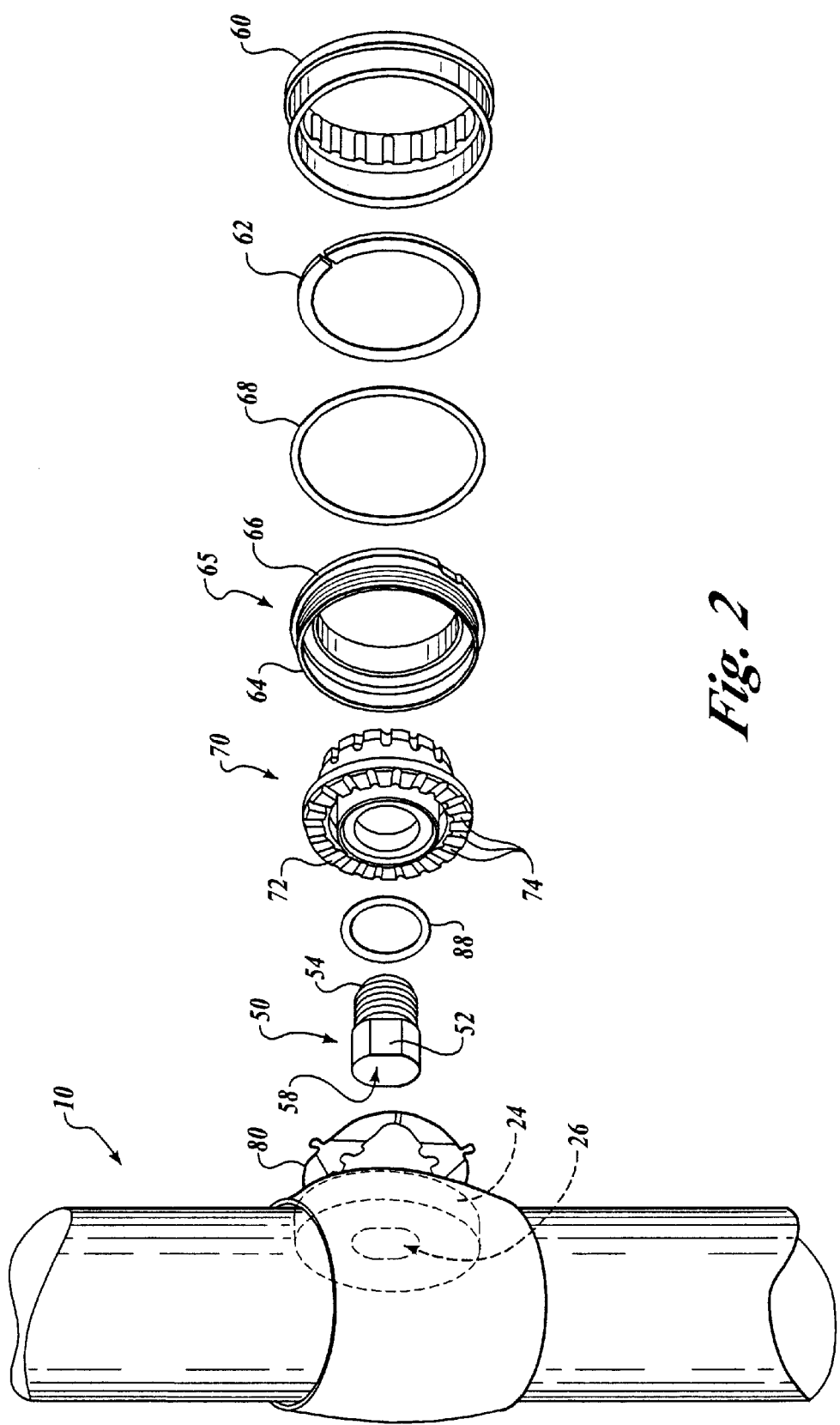
FIG. 2 is a perspective exploded view showing internal components of an embodiment of a rifle scope adjustment detent mechanism in accordance with the invention.
Figure 3:
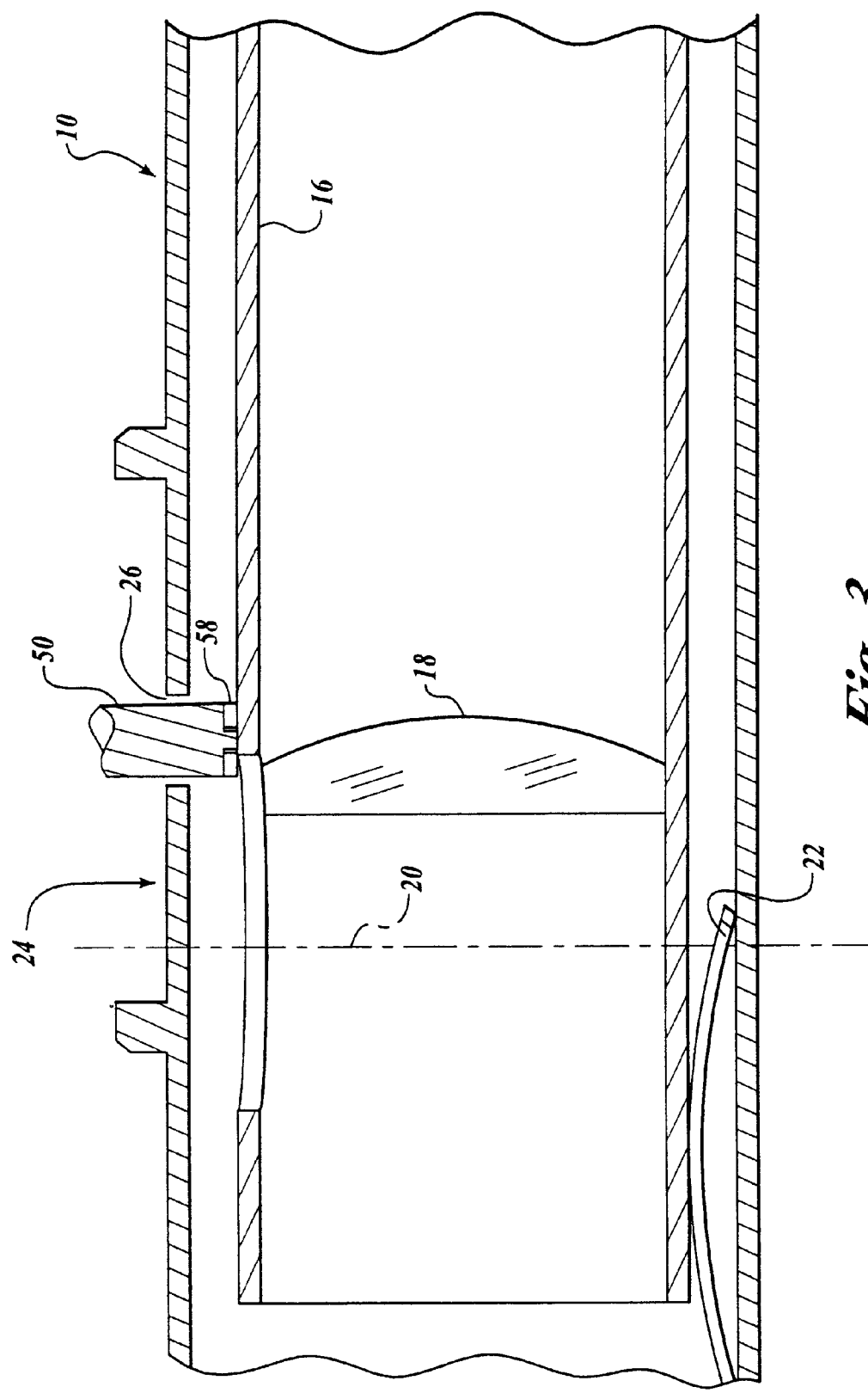
FIG. 3 is a schematic cross sectional view along a longitudinal axis of a rifle scope illustrating the outer or main tube that contains a pivotally mounted inner tube.

The exploded view of the adjusting mechanism of FIG. 2 represents an embodiment of a scope adjustment detent mechanism of the invention. The mechanism includes a jack screw 50 that has a pair of rotation flats 52 at one end, and that is threaded at the other end 54. This jack screw 50 is keyed to and reciprocates in a cooperating receiving slot 26, located on the rifle scope body in socket 24, when the scope is being adjusted so that its tip 58 is controlledly urged against an inner tube 16 of the rifle scope, as seen more clearly in FIG. 3. The inner tube 16 contains an optical system, such as a lens 18 or erector assembly, and pivots about a pivot axis 20, while supported at one location, in this case by a leaf spring 22, downward or upward movement of the jack screw 50 alters the tilt angle of the inner tube and thereby adjusts elevation or windage, as the case may be.

Returning to FIG. 2, the adjustment mechanism includes a substantially ring shaped retention flange 65, that has a threaded end 64 with external threads for screwing it into threads on the body of the scope surrounding the body socket 24. The other end 66 of the flange has a circumferential groove 69, seen more clearly in FIG. 7. A split index ring 62 is sized to fit within the circumferential groove 63 on the retention flange 65 and is held in place in the groove by friction force so that more force than it would be subjected to in ordinary use of the scope is needed to cause the index ring to rotate.

Figure 7:
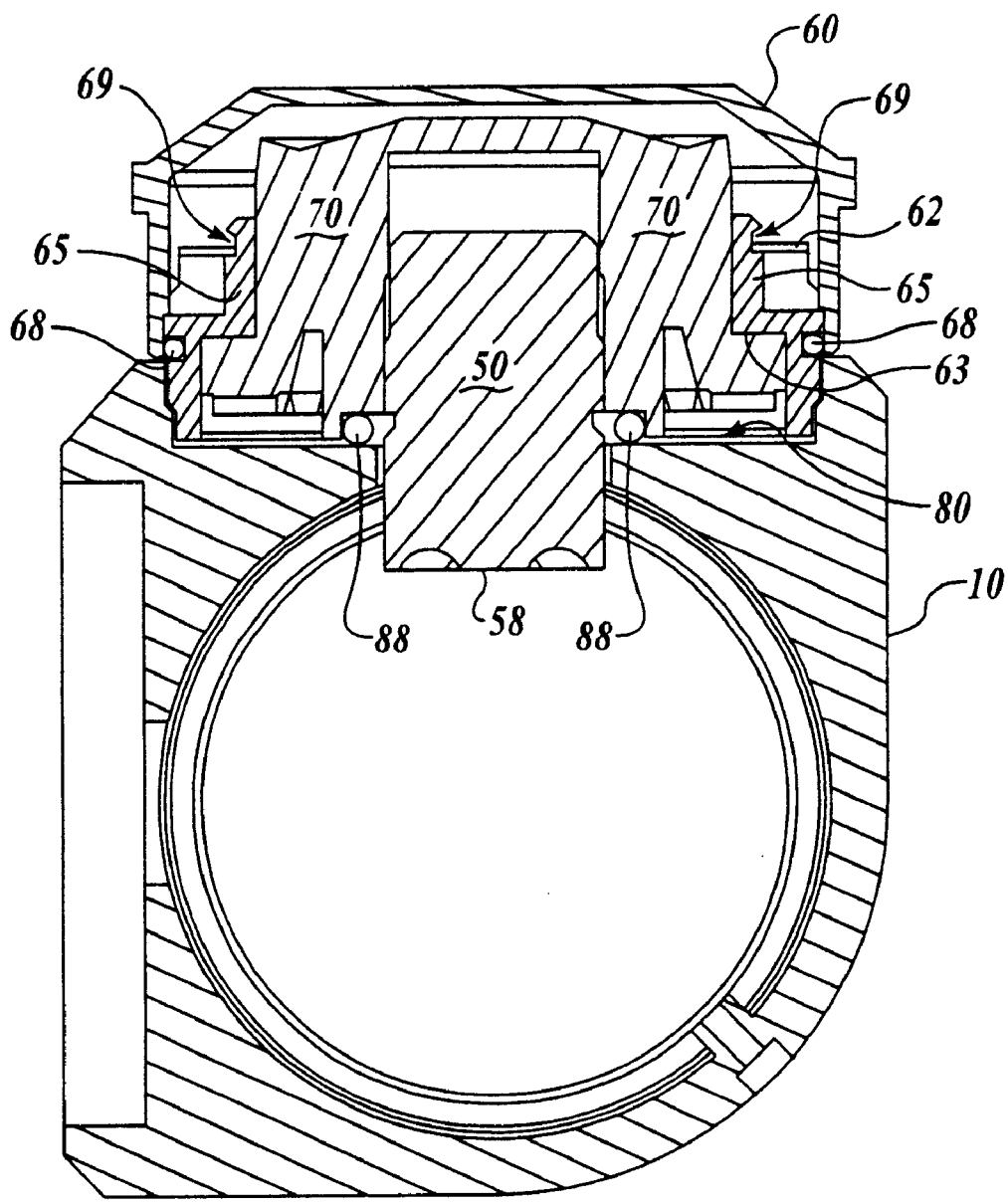
FIG. 7 is a cross sectional view of the scope of FIG. 1 taken at A—A showing how the internal components of an embodiment of a rifle scope adjustment mechanism shown exploded in FIG. 2 cooperate together.

A disk, for example, a jack nut 70, is sized to fit within the annular space of the retention flange 65 and the extent of its penetration into the flange 65 is stopped by a flange inner shoulder 63, seen more clearly in FIG. 7. The jack nut 70 may be fabricated as a single piece, or in several pieces, as discussed below. The jack nut has a ring shaped frontal flange forming a flat face 72 that includes, in the example shown, a series of equally spaced radially extending detent grooves 74. Clearly, other evenly spaced structure could also be used, for example dimples, splines, buttons, etc., that could cooperate with opposing structure on a spring, as discussed below. These grooves 74 are precisely machined, or otherwise manufactured, to close tolerances to ensure accuracy of adjustment of the rifle scope. The annular space of the jack nut 70 is supplied with a screw thread that cooperates with a screw thread on the end 54 of the jack screw, discussed above.

Figure 4:
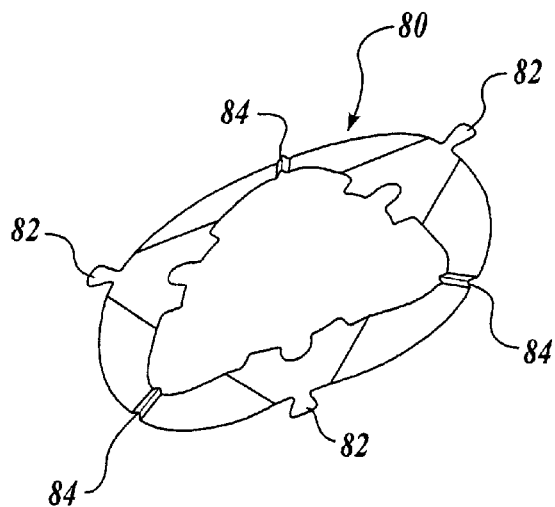
FIG. 4 is a perspective view of a biasing spring useful in the invention.
Figure 5:
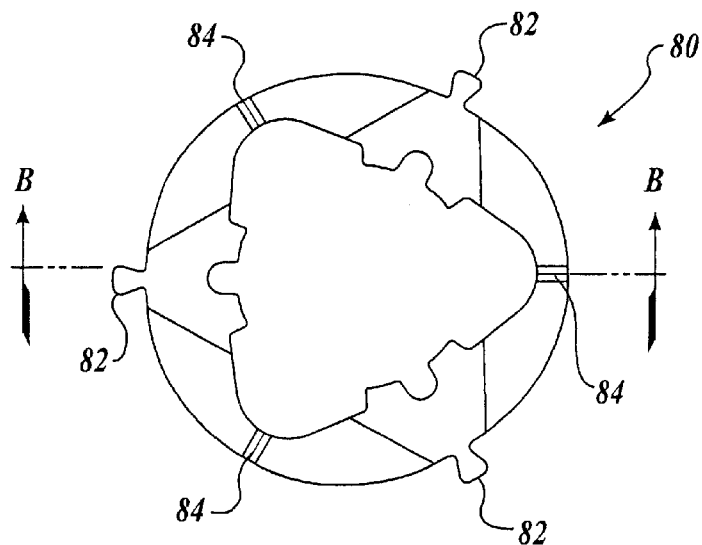
FIG. 5 is a plan view of the spring of FIG. 4.
Figure 6:
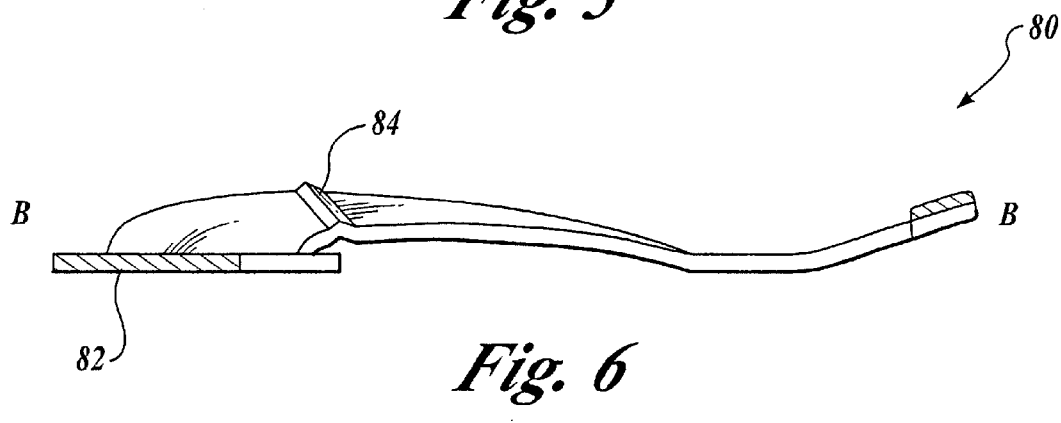
FIG. 6 is a cross sectional view of the spring at B—B of FIG. 5.

The mechanism further includes a biasing spring, for example, a pancake type spring 80. In the example shown, the spring has a substantially circular body, with center portion removed, and has three ears 82 extending outward from the spring body, as shown in FIGS. 4–6. The body of spring 80 has a convex or saucer shape, with ears 82 that are flat. Spring 80 is sized to fit within socket 24 of the scope body, so that it extends convexly upward from the base of the socket with ears pressed flat onto the socket base. Further, spring 80 includes one or a plurality of detent ridges 84, that are sized to cooperate with the grooves 74 of the jack nut 70. Thus, during operation of the adjustment mechanism when the spring is seated and held immobile in socket 24, at least one of the grooves 74 of jack nut 70 will cooperate with at least one detent ridge 84 of the spring 80. The spring may be stamped or molded, and may be of any suitable material that provides required bias force, such as metal or plastic. The example shows a one piece spring with ridges, but clearly a multi-piece spring may also be used and ridges are not essential: all that is needed is spaced structure to register with opposed structures on the disk (or jack nut in this case), that may include dimples, buttons, splines, etc., that will cause a "click" when the spring and disk structures move into registration. The spring may also be prevented from rotation by other means, such as stops, screws, keying to the socket, glue, side rails, etc.

A cap 60, that may be supplied with a user interface such as radial markings on its upper surface (not shown) to facilitate visual distance adjustment, is sized to fit over the outer end 66 of the flange 65, and to cover at least a portion of the flange 65 and the index ring 62. The cap 60 is sealed to the body of the flange 65 with O-ring seal 68, that extends circumferentially around a groove in the body of the flange 65 to form a tight seal between the outer circumference of the flange 65 and the inner surface of the cap 60 to exclude water and dust. The cap 60 includes internal structure (not shown) that engages the end 75 of jack nut 70 that extends out of the annulus of the retention flange 65. Thus, when the cap 60 is rotated radially, the jack nut rotates in concert with it. As shown, jack nut 70 includes a series of notches 76 at its end 75, and some or all of these notches may engage splines or other structure inside cap 60 (not shown).

The assembly of the separate components shown in FIG. 2 is shown in FIG. 7, a cross sectional view of FIG. 1. The spring 80 lies on the base of the rifle scope socket 24 and the tip 58 of the jack screw passes through the central opening in the spring into the receiving slot 26 of socket 24 of the main tube of the rifle scope and is surrounded by O-ring seal 88. An opposite end 54 of the screw is threaded into the jack nut 70, which in turn fits into the annular space of retention flange 65, which is threaded into the socket 24 of the rifle scope body so that the leading edge of the flange presses the ears 82 of the spring 80 onto the socket base to hold the spring immobile. The cap is then seated on the retention flange 65 and sealed in place with the aid of O-ring seal ring 68.

As will now be understood, from the above explanation and drawings, when the cap is rotated, the jack nut that is mechanically engaged with it rotates in concert and the jack screw, which is threaded to the jack nut, reciprocates, thereby causing the tilt angle of the inner tube of the rifle scope to alter i.e. adjusting the scope. When the jack nut rotates, the detent ridge or ridges of the biasing spring are pushed out of the jack nut groove or grooves in which they resided, and slip into a next groove or grooves, thereby causing an audible "click" that also transmits a tactile feel. For example, in the spring shown in FIGS. 4–6 there are three detent ridges, although more or fewer may be used. Clearly, these ridges may be spaced from each other on the face of the spring so that only one ridge coincides with a groove of the jack nut at any one time. Thus, as the nut rotates, that first ridge would move out of a groove, and a second one of the ridges would click into another groove. Further rotation would cause the second ridge to slip out of a groove, and the third ridge to click into yet another groove. Accordingly, when the nut rotates through a distance equal to the space between two grooves, there will be three clicks of the spring. Clearly, if more ridges are provided and appropriately spaced, the distance between the grooves of the jack nuts might be adjusted, or a more precise detent may be achieved by providing more separate clicks between grooves. In general, a rotation of the nut can be divided into N×S segments where N=number of spring detents, and S=number of segments (structures) on the nut. Thus in an embodiment with 3 spring detents and 20 nut grooves, there are 60 divisions (clicks) per nut 360° rotation. Thus, the invention provides a variety of options for finer tuning adjustment of the rifle scope.

The jack nut may be fabricated as a single piece, or may be made of separate components. When the jack nut is made of a single part, and if it is desired that the part should have a reasonably long life in ordinary use, then the face portion 72 of the nut and the grooves 74 might be fabricated from a hard, wear resistant material, such as a hardened metal, for example steel, tungsten carbide, and the like. Of course, if a long life of the part is not important, then other materials may also be used.

An alternative jack nut may be fabricated of two separate parts. Thus, the jack nut body 75 might be comprised of a forward portion 75a and a rearward portion 75b, as shown in FIG. 8. The forward portion 75a might be fabricated from a hard, wear resistant material, such as metal; while the rearward portion 75b might be fabricated from a plastic material through extrusion or other means. When a two-part construction is used, it is desirable that the rear portion 75b be equipped with notches 76 spaced at distances equal to the spacing between the ridges 74 on the face of the nut. Thus, when the two parts of the nut 75a and 75b are combined to form the nut, the notches and ridges could be aligned. Thus, when the cap of the rifle adjustment mechanism is removed, the exposed notches of the jack nut would give an indication as to the position of any particular groove.

The rifle scope adjustment mechanism also includes a feature for setting a "zero" position of the scope. As indicated above, an index ring is mounted to a groove of the retention flange. In accordance with the invention, the rifle scope may first be set to a "zero" or neutral position, and the index ring then mounted to the retention flange. The opening of the split ring retention flange may be oriented to a specific position when the rifle scope is zeroed. Since the index ring will not move during normal use of the scope, the gap in the index ring will always indicate when the scope is in a zero position. The cap, which may have dial markings on its upper outer surface, can readily be equipped with an indicator that can be aligned with the visible gap in the index ring, so that the dial of the cap will be coordinated to the position of the ring and hence the zero position of the scope.

It will be obvious to those having skill in the art that many changes may be made to details of the above-described embodiments of this invention without departing from its underlying principles. These changes are encompassed in the invention as set forth in the claims and its equivalents, as may be determined by a court of law. The scope of the present invention should, therefore, be determined only by reference to the following claims.

I claim:

1. An adjustable rifle scope with detent mechanism for incremental adjustment of the rifle scope, comprising:
   an outer tube including a socket having a base;
   a spring including a detent structure, the spring located in and prevented from rotational movement in the socket of the outer tube, the spring providing a bias force for urging the detent structure away from the base of the socket;
   a jack screw extending through the outer tube and keyed to the outer tube to prevent the jack screw from rotating relative to the outer tube while allowing the jack screw to reciprocate relative to the outer tube;
   a rotatable jack nut engaging the jack screw; and
   a face associated with the jack nut for rotation therewith, the face including a set of spaced face structures sized to cooperate with the detent structure of the spring, the spring urging against the face with sufficient force to urge the detent structure into registration with one of the face structures,
   whereby, in response to rotation of the jack nut, the detent structure registers against the face structures with tactile clicks each indicating an incremental rotation and the jack screw moves an incremental distance with each of the clicks to adjust the rifle scope incrementally.

2. The rifle scope of claim 1 in which the spring comprises a substantially circular body with a convex surface.

3. The rifle scope of claim 2 in which the body includes at least one ear extending outward proximate a perimeter of the body, the ear clamped against a base of the socket.

4. The rifle scope of claim 1 in which the outer tube includes a slot sized to receive the jack screw, the jack screw having at least one flat surface engaged in the slot to thereby prevent the jack screw from rotating relative to the outer tube.

5. The rifle scope of claim 1 in which the jack nut includes a set of notches aligned with the face structures, and further comprising a cap having an internal structure releasably engaged with the notches for rotatably driving the jack nut.

6. The rifle scope of claim 1, further comprising an inner tube pivotably mounted within the outer tube and holding an optical element for pivoting movement therewith, the jack screw operatively connected to the inner tube so that the optical element moves in response to rotation of the jack nut.

7. The rifle scope of claim 1 in which the jack nut includes a rear portion opposite the face, and further comprising:
   a substantially ring-shaped retention flange mounted on the outer tube, the retention flange surrounding the jack nut and including an internal shoulder abutting against the rear portion of the jack nut to rotatably contain the jack nut between the retention flange and the outer tube.

8. The rifle scope of claim 7 in which the retention flange includes an outer circumferential groove, and further comprising an index ring seated in the circumferential groove.

9. The rifle scope of claim 1 in which the set of face structures includes multiple circularly-spaced radial grooves.

10. The rifle scope of claim 1 in which the detent structure comprises at least one detent ridge.

11. The rifle scope of claim 1 in which the detent structure includes multiple detent members spaced apart such that not all of the detent members coincide with the face structures at any given time.

12. The rifle scope of claim 11 in which the face structures are evenly spaced and the detent members are also evenly spaced, and the number of the face structures are not an integer multiple of the number of the detent members, so that only one of the detent members registers with the face structures at any given time, thereby dividing each revolution of the jack nut into a number of increments totaling the product of the number of detent members times the number of face structures.

13. The rifle scope of claim 11 in which the face structures are evenly spaced and the detent members are also evenly spaced, and the number of the detent members are not an integer multiple of the number of the face structures, so that only one of the face structures registers with the detent members at any given time, thereby dividing each revolution of the jack nut into a number of increments totaling the product of the number of detent members times the number of face structures.

14. A mechanism for making incremental adjustments in a rifle scope, comprising:
   a body supporting a detent structure, the body adapted for mounting to an outer tube of a rifle scope to prevent rotational movement of the body relative to the outer tube;
   a spring operatively associated with the body for urging the detent structure away from the outer tube;
   a jack screw including a flat side surface for keying the jack screw to the outer tube to prevent rotational movement of the jack screw relative to the outer tube while allowing the jack screw to reciprocate relative to the outer tube;
   a jack nut adapted to be supported on the outer tube for rotation relative thereto, the jack nut threadably engaging the jack screw; and
   a face associated with the jack nut for rotation therewith, the face including a set of face structures opposite the detent structure of the body, the face structures spaced apart in a substantially circular pattern and sized to cooperate with the detent structure, the spring urging the body against the face with sufficient force to urge the detent structure into registration with one or more of the face structures,
   whereby, in response to rotation of the jack nut, the detent structure registers against the face structures with tactile clicks each indicating an incremental rotation and the jack screw moves an incremental distance with each of the clicks for adjusting the rifle scope incrementally.

15. The mechanism of claim 14 in which the body is formed on the spring, which comprises a substantially circular member with a convex surface.

16. The mechanism of claim 14, further comprising a cap covering the jack nut, the cap releasably engaging the jack nut.

17. The mechanism of claim 14 in which the face structures include multiple circularly-spaced radial grooves.

18. The mechanism of claim 17 in which the detent structure includes multiple detent ridges extending radially from a center of the body.

19. The rifle scope of claim 14 in which the detent structure includes multiple detent members spaced apart such that not all of the detent members register with the face structures at any given time.

20. The rifle scope of claim 19 in which the face structures are evenly spaced and the detent members are also evenly spaced, and the number of the face structures are not an integer multiple of the number of the detent members, so that only one of the detent members registers with the face structures at any given time, thereby dividing each revolution of the jack nut into a number of increments totaling the product of the number of detent members times the number of face structures.

21. The rifle scope of claim 19 in which the face structures are evenly spaced and the detent members are also evenly spaced, and the number of the detent members are not an integer multiple of the number of the face structures, so that only one of the face structures registers with the detent members at any given time, thereby dividing each revolution of the jack nut into a number of increments totaling the product of the number of detent members times the number of face structures.

22. In a rifle scope adjustment mechanism of the type having a manually rotatable member adapted for rotatable mounting on a rifle scope for adjusting the rifle scope, an improved detent mechanism for dividing each revolution of the rotatable member into multiple incremental amounts of rotation that impart incremental adjustments to the rifle scope, comprising:
   a body having a detent structure, the body adapted to be supported on the rifle scope and restricted from rotation relative thereto;
   a face associated with the rotatable member for rotation therewith, the face including multiple face structures opposite the detent structure of the body, the face structures spaced apart in a substantially circular pattern and sized to cooperate with the detent structure; and
   a spring operatively associated with the body to urge the body against the face with sufficient force to urge the detent structure into registration with one or more of the face structures,
   whereby, in response to rotation of the rotatable member, the detent structure registers against the face structures with tactile clicks each indicating an incremental rotation of the rotatable member thereby facilitating incremental adjustment of the rifle scope.

23. The mechanism of claim 22 in which the body is formed on the spring, and the spring comprises a substantially circular member with a convex surface.

24. The mechanism of claim 22 in which the face structures include multiple circularly-spaced radial grooves.

25. The mechanism of claim 24 in which the detent structure includes multiple detent ridges.

26. The rifle scope of claim 22 in which the detent structure includes multiple detent members spaced apart such that not all of the detent members register with the face structures at any given time.

27. The rifle scope of claim 26 in which the face structures are evenly spaced and the detent members are also evenly spaced, and the number of the face structures are not an integer multiple of the number of the detent members, so that only one of the detent members registers with the face structures at any given time, thereby dividing each revolution of the rotatable member into a number of increments totaling the product of the number of detent members times the number of face structures.

28. The rifle scope of claim 26 in which the face structures are evenly spaced and the detent members are also evenly spaced, and the number of the detent members are not an integer multiple of the number of the face structures, so that only one of the face structures coincides with the detent members at any given time, thereby dividing each revolution of the jack nut into a number of increments totaling the product of the number of detent members times the number of face structures.

* * * * *